(12) United States Patent
Heigl et al.

(10) Patent No.: US 11,066,034 B2
(45) Date of Patent: Jul. 20, 2021

(54) AIRBAG MODULE FOR PROTECTING THE HEAD

(71) Applicant: TRW AUTOMOTIVE GMBH, Alfdorf (DE)

(72) Inventors: Jürgen Heigl, Bobingen (DE); Hans-Joachim Tietze, Heubach (DE); Robert Disam, Mutlangen (DE); Steffen Seidel, Mutlangen (DE); Michael Rieger, Rechberghausen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 415 days.

(21) Appl. No.: 15/999,595

(22) PCT Filed: Feb. 15, 2017

(86) PCT No.: PCT/EP2017/053387
§ 371 (c)(1),
(2) Date: Aug. 20, 2018

(87) PCT Pub. No.: WO2017/140719
PCT Pub. Date: Aug. 24, 2017

(65) Prior Publication Data
US 2021/0039580 A1    Feb. 11, 2021

(30) Foreign Application Priority Data

Feb. 19, 2016 (DE) .................... 10 2016 001 942.5

(51) Int. Cl.
*B60R 21/217* (2011.01)
*B60R 21/231* (2011.01)
(Continued)

(52) U.S. Cl.
CPC ...... *B60R 21/2176* (2013.01); *B60R 21/2171* (2013.01); *B60R 21/231* (2013.01); *B60R 21/237* (2013.01); *B60R 21/213* (2013.01); *B60R 21/232* (2013.01); *B60R 2021/0048* (2013.01); *B60R 2021/161* (2013.01)

(58) Field of Classification Search
CPC .................................................. B60R 21/2176
See application file for complete search history.

(56) References Cited

U.S. PATENT DOCUMENTS 6,199,896 B1 * 3/2001 Brucker .................. B60R 21/20
280/728.2
6,517,102 B2 * 2/2003 Kolb .................... B60R 21/2176
280/728.3

(Continued)

FOREIGN PATENT DOCUMENTS

DE    29921340 U1 * 4/2000    .......... B60R 21/213
DE    29921340      5/2000
(Continued)

*Primary Examiner* — Faye M Fleming
(74) *Attorney, Agent, or Firm* — Tarolli, Sundheim, Covell & Tummino LLP

(57) ABSTRACT

A head protection airbag module comprising a tubular inflator, a holder for the inflator and an airbag which is in fluid communication with the inflator and is folded to form a package, characterized by a guide element for the airbag which is arranged on the holder and includes a guide tongue extending into the airbag package.

8 Claims, 3 Drawing Sheets

(51) Int. Cl.
    *B60R 21/237*     (2006.01)
    *B60R 21/213*     (2011.01)
    *B60R 21/232*     (2011.01)
    *B60R 21/00*     (2006.01)
    *B60R 21/16*     (2006.01)

(56) References Cited

U.S. PATENT DOCUMENTS

| | | | |
|---|---|---|---|
| 7,699,343 B2 * | 4/2010 | Kwak | B60R 21/213 |
| | | | 280/730.2 |
| 2012/0032424 A1 | 2/2012 | Weigand et al. | |
| 2016/0075300 A1 | 3/2016 | Tietze et al. | |

FOREIGN PATENT DOCUMENTS

| | | |
|---|---|---|
| DE | 10154964 | 5/2003 |
| DE | 102007001476 | 7/2008 |

* cited by examiner

AIRBAG MODULE FOR PROTECTING THE HEAD

RELATED APPLICATIONS

This application corresponds to PCT/EP2017/053387, filed Feb. 15, 2017, which claims the benefit of German Application No. 10 2016 001 942.5 filed Feb. 19, 2016, the subject matter of which are incorporated herein by reference in their entirety.

BACKGROUND OF THE INVENTION

The invention relates to a head protection airbag module comprising a tubular inflator, a holder for the inflator and an airbag being in fluid communication with the inflator and being folded into a package.

Such airbag module is disposed along the outer edge of a roof of an automotive vehicle so that, after the inflator having been ignited, the airbag deploys along the inside of the windows of the vehicle. Accordingly, the airbag may extend from the A-pillar of the vehicle to the C-pillar in the deployed state.

In order to enable the airbag to deploy in the desired direction it is important that it is arranged as precisely as possible at the roof. To this end, fastening clips can be used. In DE 20 2014 003 512 an example of such fastening clip is found.

It is also known to fix the airbag package by tape on the holder of the inflator.

SUMMARY OF THE INVENTION

It is the object of the invention to align the airbag package even more precisely.

In order to achieve said object, in an airbag module of the type mentioned in the beginning a guide element for the airbag is provided which is arranged on the holder and includes a guide tongue extending into the airbag package. This helps to specifically align the folds of the airbag package in the vicinity of the inflator, thus causing the initial deployment of the airbag in the area of the inflator to become more robust. It is of particular advantage that the guide element itself is precisely aligned by being arranged on the holder of the inflator which in turn is arranged on the vehicle body and thus can reliably serve as reference surface. The spatial orientation and, resp., angular position of the guide element and/or the spatial orientation and, resp., angular position of the guide tongue may help to influence the direction of deployment and to reach improved reproducibility of the deployment of the airbag.

In accordance with one embodiment of the invention, the guide element is provided to include a body portion that extends tangentially to the inflator. In this way, the airbag package is arranged precisely below the inflator.

Preferably, the guide tongue extends approximately perpendicularly to the body portion on the side on which also the inflator is provided. In this way, the airbag package is subdivided into a portion close to the inflator and a portion distant from the inflator, which allows to specifically influence the start of the deployment operation in the desired way.

Depending on the deployment direction to be obtained, the guide tongue may as well be arranged at an angle deviating from the right angle related to the body portion.

The guide tongue backs the defined position of the portion close to the inflator of the airbag package, thus causing above all the first deployment phase of the airbag to be specifically controlled. The portion of the airbag package close to the inflator in this case has the function of a (single-layer or multi-layer) ejecting fold which is filled first and controls the early deployment behavior.

According to a preferred configuration, it is provided that the guide element is clamped between the holder and the inflator. In this way, the guide element is reliably held with little effort.

Preferably, the guide element includes two retaining lands located on the one side and the other side of the holder. Retaining lands are used to achieve mechanical positive fixation of the guide element to the holder.

In accordance with a preferred embodiment, the airbag package is provided to include an inflator-side portion and a main portion, wherein the major part of the wall of the airbag is located in the main portion and the guide tongue protrudes into the airbag package between the inflator-side portion and the main portion. In this way, specifically only the start of the deployment operation is influenced, while the major part of the wall of the airbag can deploy without being disturbed by the guide element. The inflator-side portion of the airbag package may consist of one to five folds of the airbag wall.

The airbag may be rolled or else be folded to form superposed folds in the main portion. Both types of folding result in the desired influence of the guide tongue on the start of the deployment operation.

BRIEF DESCRIPTION OF THE DRAWINGS

In the following, the invention shall be described by way of different embodiments shown in the enclosed drawings, wherein.

DESCRIPTION

Figure 1:
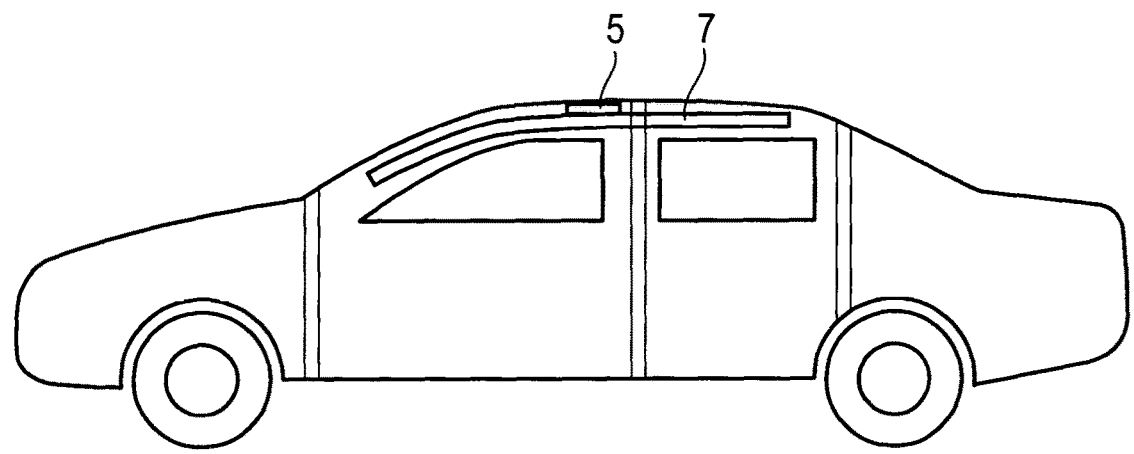
FIG. 1 schematically shows a side view of an automotive vehicle provided with a head protection airbag module according to the invention.

FIG. 1 schematically illustrates a vehicle 1 provided with two head protection airbag modules 2 only one of which is visible in FIG. 1.

Each head protection airbag module extends along the lateral edge of a roof in the vehicle interior and as substantial components includes an inflator 5 and an airbag 7. The airbag may be deployed starting from a folded position so that it will extend over at least part of the side windows of the vehicle and approximately from an A-pillar via the B-pillar to the C-pillar.

Figure 2:
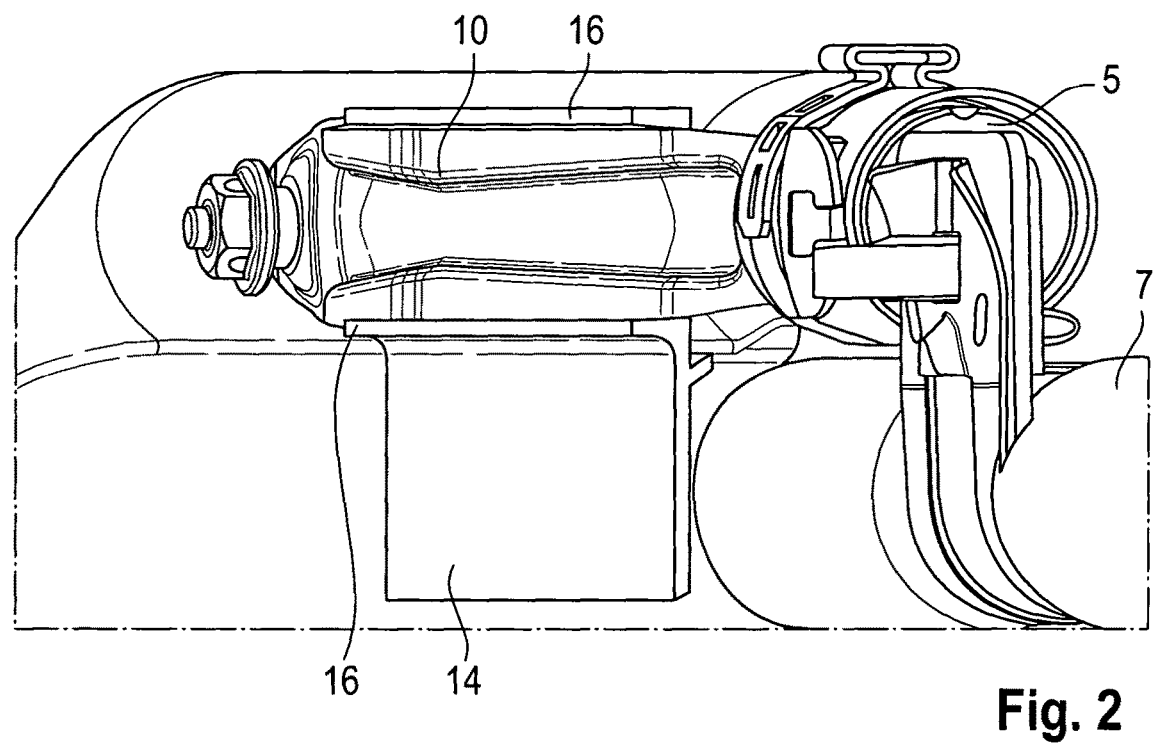
FIG. 2 shows a perspective broken view of a head protection airbag module according to the invention.
Figure 5:
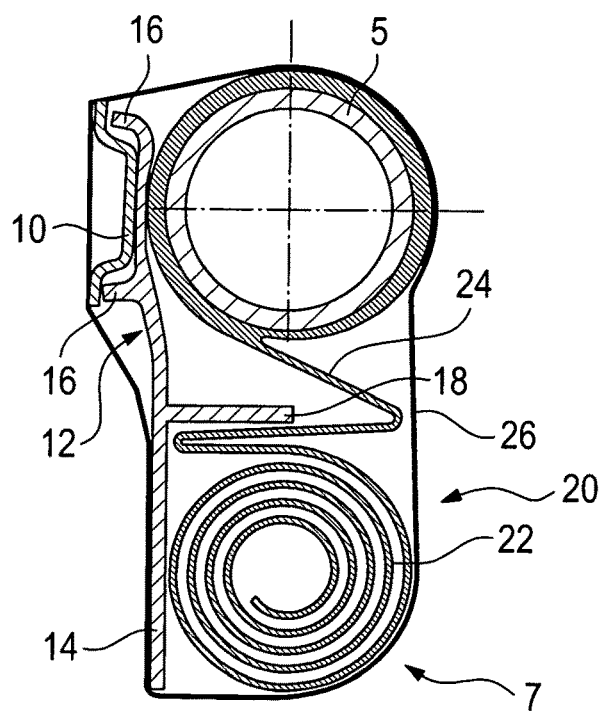
FIG. 5 shows a sectional view of the head protection airbag module of FIG. 1 with a second variant of the folded airbag.

In FIG. 2, the inflator 5 which is arranged on a holder 10 is visible. The inflator 5 is connected to the vehicle body by means of the holder 10. The inflator 5 is shown in FIG. 5 by the example of a so-called center module, i.e. the inflator is disposed in a central area of the airbag module, wherein the gas flow is guided through elements known per se into the front and rear parts of the airbag 7. However, it is equally possible to design the airbag module as a module filled at the end side, i.e. at the front or rear side, with the inflator being arranged at the front-side or rear-side end of the airbag module in that case.

Figure 3:
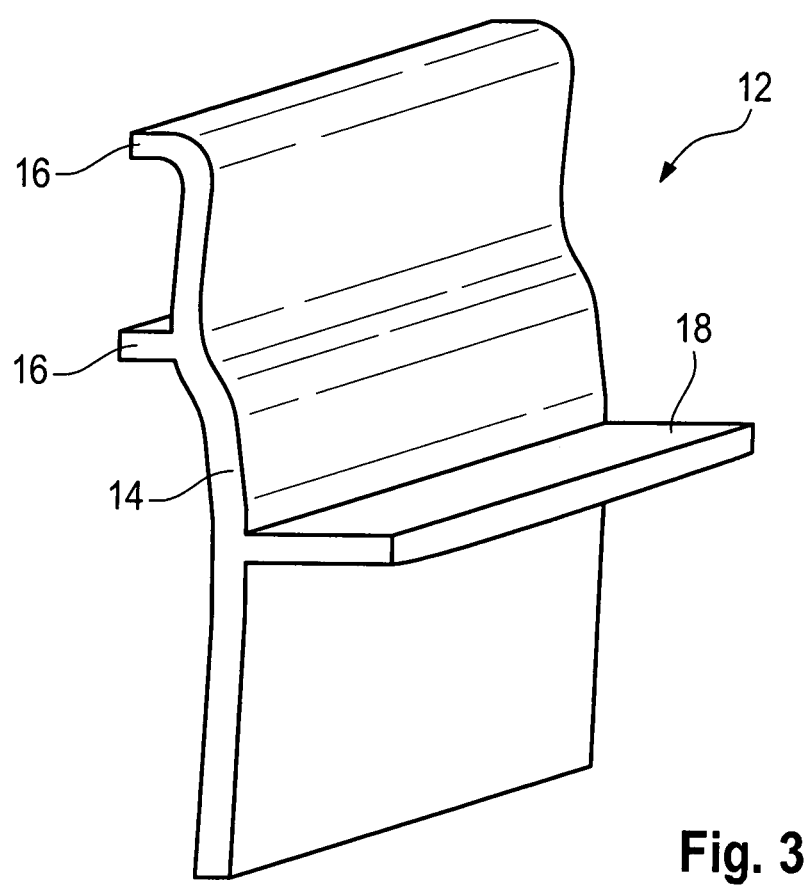
FIG. 3 shows a perspective view of a guide element used in the head protection airbag module according to the invention.

Between the holder 10 and the inflator 5 a guide element 12 for the airbag 7 is arranged (cf. also FIG. 3). Said guide element includes a body portion 14 which is configured as a flat plate in the broadest sense.

At one end (at the top in FIG. 3) the body portion is provided with two retaining lands 16. They are located on either side of the holder 10 of the inflator 5, with the upper end of the body portion 14 being clamped between the holder 10 and the inflator 5. The guide element 12 thus abuts quasi positively on the holder 10. In this way, the body portion is provided at a defined position relative to the inflator and to the holder. Since the holder is provided at a defined position relative to the vehicle body, thus also the guide element in total is aligned with the vehicle body in a precise and defined manner. The retaining lands prevent tilting about an axis that is perpendicular to the body portion 14, and the full-surface contact with the holder 10 prevents tilting about an axis which extends in parallel to the longitudinal axis of the tubular inflator 5.

The body portion 14 includes a guide tongue 18 extending approximately perpendicularly to the body portion 14 on the side being opposed to the retaining lands 16. The guide tongue 18 is located below the retaining lands 16 so far that a distance is resulting between the guide tongue 18 and the lower edge of the inflator 5 (see FIG. 4).

Figure 4:
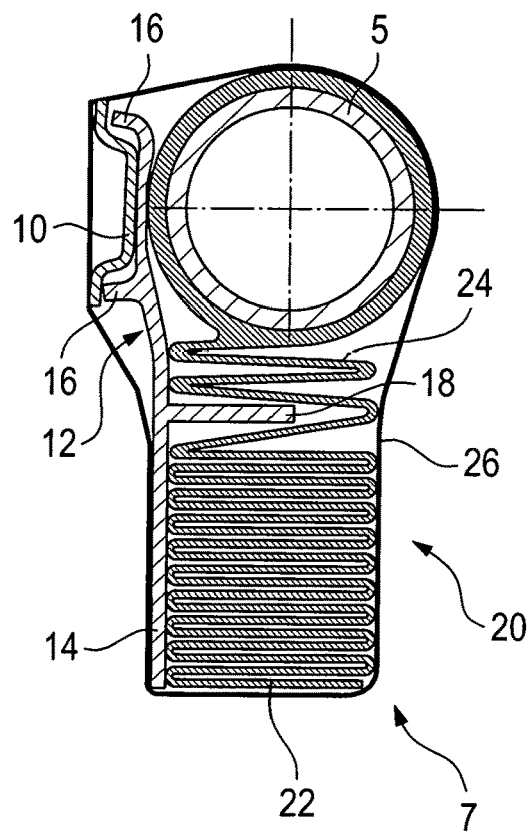
FIG. 4 shows a sectional view of the head protection airbag module of FIG. 1 with a first variant of the folded airbag.

In FIG. 4, furthermore the folded airbag 7 is evident which forms an airbag package 20. The guide tongue 18 extends into said airbag package so that on the side of the guide tongue 18 facing away from the inflator a main portion 22 of the airbag package 20 is formed and between the inflator 5 and the guide tongue 18 an inflator-side portion 24 of the airbag package 20 is formed.

The portion 24 of the airbag package is formed of three to four (double-walled) folds of the airbag 7. The main portion 22 consists of the remaining wall of the airbag 7 which is superposed in folds.

In this case, a wrapping 26 which fixes the airbag 7 in the folded state and may also serve as a protection against environmental influences extends around the airbag module.

FIG. 5 illustrates a variant. For the features known from the embodiment shown in FIG. 4 the same reference numerals are used and, in this respect, the foregoing explanations are referred to.

The variant shown in FIG. 5 differs from the embodiment shown in FIG. 4 by the folding of the airbag 7 and by the inflator-side portion 24 of the airbag package 20.

The main portion 22 of the airbag package 20 in this case is folded by means of rolled folding.

The inflator-side portion 24 of the airbag package 20 here consists of one single fold.

The guide element 12 ensures the airbag package 20 to be precisely aligned in the area of the inflator. The guide tongue provides for the start of the deployment operation to be more robust, i.e. to take place with smaller tolerances. This helps to ensure more precisely the direction in which the airbag 7 will deploy.

The invention claimed is:

1. A head protection airbag module comprising a tubular inflator (5), a holder (10) for the inflator (5) and an airbag (7) which is in fluid communication with the inflator (5) and is folded to form a package (20), wherein a guide element (12) for the airbag (7) is arranged on the holder (10) and includes a guide tongue (18) extending into the airbag package (20), wherein the guide element (12) includes a body portion (14) which extends tangentially to the inflator (5).

2. The airbag module according to claim 1, wherein the guide tongue (18) extends approximately perpendicularly to the body portion (14) on the side where also the inflator (5) is located.

3. A head protection airbag module comprising a tubular inflator (5), a holder (10) for the inflator (5) and an airbag (7) which is in fluid communication with the inflator (5) and is folded to form a package (20), wherein a guide element (12) for the airbag (7) is arranged on the holder (10) and includes a guide tongue (18) extending into the airbag package (20), wherein the guide element (12) is clamped between the holder (10) and the inflator (5).

4. A head protection airbag module comprising a tubular inflator (5), a holder (10) for the inflator (5) and an airbag (7) which is in fluid communication with the inflator (5) and is folded to form a package (20), wherein a guide element (12) for the airbag (7) is arranged on the holder (10) and includes a guide tongue (18) extending into the airbag package (20), wherein the guide element (12) includes two retaining lands (16) located on the either side of the holder (10).

5. A head protection airbag module comprising a tubular inflator (5), a holder (10) for the inflator (5) and an airbag (7) which is in fluid communication with the inflator (5) and is folded to form a package (20), wherein a guide element (12) for the airbag (7) is arranged on the holder (10) and includes a guide tongue (18) extending into the airbag package (20), wherein the airbag package (20) includes an inflator-side portion (24) and a main portion (22), wherein the major part of the wall of the airbag (7) is located in the main portion (22) and the guide tongue (18) protrudes into the airbag package (20) between the inflator-side portion (24) and the main portion (22).

6. The airbag module according to claim 5, wherein the airbag (7) is rolled in the main portion (22).

7. The airbag module according to claim 5, wherein the airbag (7) is folded into superposed folds in the main portion (22).

8. The airbag module according to claim 5, wherein the inflator-side portion (24) of the airbag package (20) comprises of one to five folds of the airbag wall.

* * * * *